3,250,559
CAPTIVE SCREW
Charles C. Sommerfeld, Anaheim, Calif., assignor to Northrop Corporation, Beverly Hills, Calif., a corporation of California
Filed Oct. 14, 1963, Ser. No. 315,964
3 Claims. (Cl. 292—251)

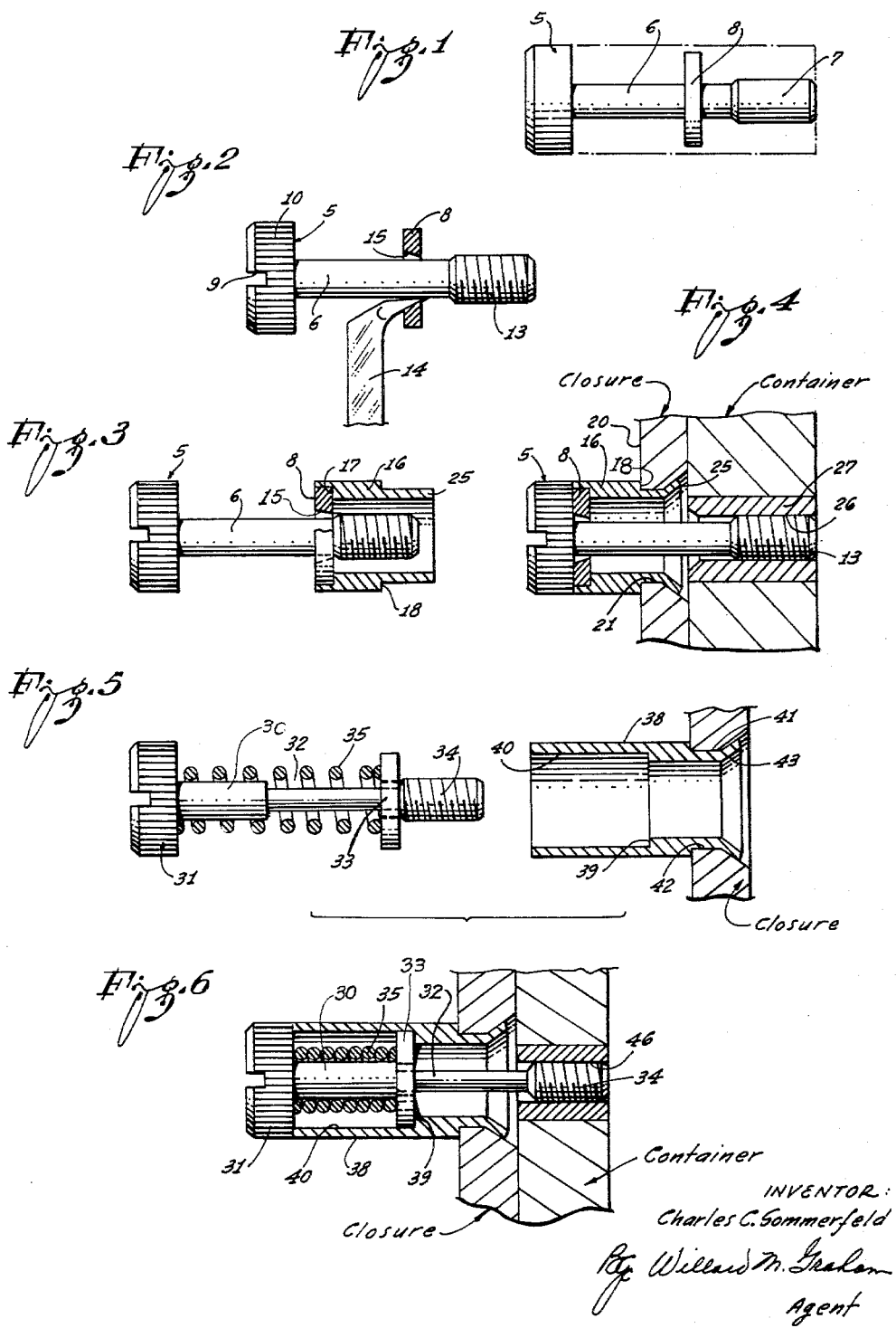

My invention relates to fasteners and more particularly to an improved captive screw fastener that is ideally suited for quick assembly and disassembly of closures with containers.

The main disadvantage in current captive screw fasteners wherein the screw is retained or captured within its receptacle by means of a rubber O-ring or deformable bushing occurs after a relatively short period of use wherein the O-ring or bushing becomes worn by galling, enlarged and often ruptured, and must be frequently replaced.

It is an object of my invention to provide an improved captive screw fastener assembly that is wear-resistant and substantially permanently captured.

Briefly, my improvement relates to a captive screw in which the retainer washer of the fastener is integrally captured on the shank of the screw and press-fitted within a receptacle defining an apertured plug therein.

Other objects and advantages of my captive screw will be more clearly understood with reference to the ensuing detailed specification and drawings wherein:

FIGURE 1 is a view in elevation showing the screw blank of my invention after the primary machining cuts are completed.

FIGURE 2 is a view in elevation and partly in cross-section showing one way in which the retention washer is captured on the screw shank.

FIGURE 3 is a view in elevation and partly in cross-section showing the screw and retention washer assembled in its receptacle.

FIGURE 4 is a partially fragmentary view in elevation showing the captured screw assembly mounted in a closure fastened in place in a container.

FIGURE 5 is a view in elevation and partly in cross-section showing another embodiment of my invention employing a spring mounted screw.

FIGURE 6 is a view in elevation and partly in cross-section showing the captive screw assembly of FIGURE 5 mounted in a closure panel which is attached in place to a container.

As shown in FIGURE 1, a blank is formed in the conventional manner and includes a head 5, shank 6, threadable end 7, and a disk or collar 8 intermediate the ends 5 and 7 integral with shank 6. The outside diameter of collar 8 is made slightly smaller than that of head 5.

The final machining steps, as shown in FIGURE 2, include cutting a tool slot 9 and milling 10 in head 5, threads 13 on the end of shank 6 and separation of the collar 8 from shank 6 by employing a bent inside necking tool 14 to cut around the base of collar where it joins shank 6, through the section thereof to provide an aperture 15 through collar 8, the aperture 15 having a slightly larger diameter than shank 6 and slightly smaller than the major diameter of thread 13.

As shown in FIGURE 3, the standoff barrel or receptacle 16, fabricated from tubing of any suitable rigid material, is counterbored to provide an internal shoulder 17 at one end thereof to receive and abut retention washer 8 which is press-fitted thereinto defining, in effect, an apertured plug enclosing the open end of the receptacle 16.

For installation of the screw assembly in a closure or instrument panel the outside diameter of the opposite end of the receptacle 16 is reduced to define an external peripheral shoulder 18 that abuts the exterior wall 20 of the panel around the opening of a bore 21 provided therein, as shown in FIGURE 4.

The exterior wall 20 of the panel around the opposite opening of the bore is chamfered so that the fastening end 25 of the receptacle 16 can be swaged or flared therein to securely fasten the receptacle in the panel bore 21.

The wall of the container to be closed is provided with a bore 26 threaded to mate with the threads 13 of the screw assembly to mount the closure over a container such as an electronic console, for example.

In some cases, the container wall may be made of wood, plastic or other non-metallic material wherein the fastener bores are fitted with an internally threaded metal insert 27 somewhat as illustrated in FIGURE 4.

The full and complete engagement of threads 13 with threads 26 of insert 27 causes head 5 to press-fit retention washer 8 against shoulder 17 providing captivity of screw assembly in receptacle 16.

Thus it can be seen that the screw assembly is securely mounted in the panel and retained within its receptacle 16 by the integral retention washer 8 whose resistance to wear is identical with the screw itself.

It is desirable in many closure and container assemblies to spring-bias the screw outwardly relative to the receptacle.

In FIGURES 5 and 6 a screw similar to that of FIGURES 1–4 is shown, having a head 31, shank 32, integral retention washer 33, and threaded end 34; provided with a coil spring 35 positioned between the head 31 and washer 33, tending to exert its force to bias the washer 33 toward and against the threaded end 34 as shown.

It is preferred to increase the diameter of shank 32 adjacent to head 31 approximately midway between head 31 and threaded end 34, to provide thereon a shoulder 30 having a diameter that is approximately the same as the interior diameter of the spring 35 so that the spring 35 remains centered thereon relative to the center axis of the screw assembly.

The receptacle 38 is counterbored at least midway between its ends to provide an interior shoulder 39 to abut the retention washer 33 press-fitted in counterbore 40 in assembling the screw with its receptacle. The counterbore 40 can be lapped if necessary to increase the diameter thereof for easier insertion of retention washer 33.

The exterior diameter of receptacle 38 is reduced adjacent to its fastening end 41, for insertion into a bore 42 provided in a panel therefor; the bore 12 being countersunk at its interior opening so that the end of the barrel can be swaged or flared therein as shown in FIGURE 5.

Thus it can be seen that spring 35 is compressed and contained within counterbore 40 of the receptacle 38 when the panel in which the assembly is mounted is aligned with a thread bore 46 of a container, console or box, and the engaging threads 34 threadably engaged in threaded bore 46.

In full and complete engagement of threaded end 34 with threaded bore 46, shoulder 30 of shank 32 will press-fit retention washer 33 against shoulder 39 providing secure captivity of screw assembly in receptacle 38.

When the screw assembly is disengaged from the threaded bore 46, it will be seen that spring 35 will exert its force against screw head 31 to bias the screw assembly outwardly with respect to receptacle 38.

In FIGURE 2, I show one method of fabricating the screw and retention washer, i.e., providing the retention washer on the screw shank in such a way that the washer cannot be removed without deformation or destruction thereof.

However, one alternative method is to complete the machining of the screw blank without the collar 8 shown in FIGURE 1.

Prior to threading the threadable end 7, a washer having an aperture that is only slightly greater than the threadable end 7 is slipped onto the shank 6, and subsequently rolling the threads into threadable end 7. As is well known, the thread rolling operation moves material outwardly from the axis of the screw shank in the formation of the threads whereby the major diameter of the rolled threads becomes appreciably greater than the diameter of the washer aperture to effectively capture the washer on the shank between the head and threaded ends thereof.

No doubt other alternative methods of capturing the retention washer 33 on the screw shank will occur to those skilled in the art. However, all such assemblies are deemed to come within the spirit of my invention.

The above captive screw assembly is susceptible of manufacture from any suitable rigid material such as plastic or metal, and has numerous other modifications and applications all of which are deemed to fall within the spirit and scope of the claims that follow.

What is claimed is:
1. A captive fastener comprising:
 (a) a substantially cylindrical screw member having a centrally located shank, a head on one end thereof and engaging means on the other end thereof, said shank having an enlarged diameter portion adjacent said head to form an external shoulder facing in the direction of said engaging means;
 (b) a washer-like retention member on said screw member, said retention member having an inner diameter greater than the diameter of said shank but less than the diameter of said engaging means and said enlarged portion, whereby said retention member fits loosely on said shank between said engaging means and said shoulder;
 (c) a tubular receptacle member in which said screw member is retained, said receptacle member having holding means combined with the inner wall thereof for integrally retaining said retention member at a predetermined position; and
 (d) a compression coil spring installed on said screw member between said head and said retention member, the inner diameter of said coil spring being slightly greater than the diameter of said enlarged shank portion;
  whereby said engaging means is normally spring-retracted completely within said receptacle member against said retention member, and whereby when said screw member is forcibly inserted into said receptacle member, said retention member is forced by said shoulder into said holding means to contain said screw member movably captive in said receptacle member.

2. A captive fastener comprising:
 (a) a substantially cylindrical screw member having a centrally located shank, a head on one end thereof and engaging means on the other end thereof, said shank having an enlarged diameter portion adjacent said head to form an external shoulder facing in the direction of said engaging means;
 (b) a washer-like retention member on said screw member, said retention member having an inner diameter greater than the diameter of said shank but less than the diameter of said engaging means and said enlarged portion, whereby said retention member fits loosely on said shank between said engaging means and said shoulder; and
 (c) a tubular reecptacle member in which said screw member is retained, said receptacle member having an internal shoulder against which said retention member is seated, and the inner diameter of said receptacle adjacent said internal shoulder being a press fit on the outer diameter of said retention member;
  whereby when said screw member is forcibly inserted into said receptacle member, said retention member is forced by said external shoulder into said press fit in said receptacle member to contain said screw member movably captive in said receptacle member.

3. Apparatus in accordance with claim 2 wherein the various said members are dimensioned such that said head is in abutting contact with the adjacent end of said receptacle member at substantially the same time as said shank shoulder is against said retention member when the latter is against said internal shoulder.

References Cited by the Examiner
UNITED STATES PATENTS

| | | |
|---|---|---|
| 1,429,117 | 9/1922 | Thomas. |
| 1,868,415 | 7/1932 | Gundersen et al. ___ 85—50 X |
| 2,537,575 | 1/1951 | Crowther _____ 151—37 |
| 2,831,520 | 4/1958 | Clarke _____ 151—69 |
| 2,922,456 | 1/1960 | Kann _____ 151—69 |
| 3,126,935 | 3/1964 | Tuozzo _____ 151—69 |

FOREIGN PATENTS 23,743     1892    Great Britain.

PATRICK A. CLIFFORD, *Primary Examiner.*

M. HENSON WOOD, JR., *Examiner.*

R. E. MOORE, *Assistant Examiner.*